US006046451A

United States Patent [19]

Sinha

[11] Patent Number: 6,046,451

[45] Date of Patent: Apr. 4, 2000

[54] GCMS WEIGHT REDUCTION TECHNIQUES

[75] Inventor: Mahadeva P. Sinha, Temple City, Calif.

[73] Assignee: California Institute of Technology, Pasadena, Calif.

[21] Appl. No.: 08/881,705

[22] Filed: Jun. 24, 1997

Related U.S. Application Data

[63] Continuation-in-part of application No. 08/600,861, Feb. 9, 1996, Pat. No. 5,801,380.

[51] Int. Cl.[7] ............................ B01D 59/44; H01J 49/00

[52] U.S. Cl. ............................................ 250/298; 250/281

[58] Field of Search .................................... 250/281, 296, 250/298

[56] References Cited

U.S. PATENT DOCUMENTS

| | | | |
|---|---|---|---|
| 2,566,037 | 8/1951 | Shewell | 250/299 |
| 3,996,464 | 12/1976 | Fletcher et al. | 250/298 |
| 4,727,249 | 2/1988 | Bateman et al. | 250/298 |
| 4,789,787 | 12/1988 | Parker | 250/296 |
| 5,155,357 | 10/1992 | Hemond | 250/281 |
| 5,317,151 | 5/1994 | Sinha et al. | 250/298 |
| 5,414,356 | 5/1995 | Yoshimura et al. | 324/239 |
| 5,517,161 | 5/1996 | Andersson et al. | 333/202 |

*Primary Examiner*—Bruce C. Anderson
*Attorney, Agent, or Firm*—Fish & Richardson P.C.

[57] ABSTRACT

Improvements to reduce the size of a GCMS while improving its performance. A first improvement adjusts the magnet for radii of travel. Another feature removes a portion of the magnet to compensate for the fringe field. Yet another improvement shaves portions off of the yoke near where they meet the pole pieces.

5 Claims, 7 Drawing Sheets

GCMS WEIGHT REDUCTION TECHNIQUES

This application is a continuation-in-part of U.S. patent application Ser. No. 08/600,861, entitled Array Detectors for Simultaneous Measurements of Ions in Mass Spectrometry, which was filed Feb. 9, 1996 now U.S. Pat. No. 5,801,380.

FIELD OF THE INVENTION

The present invention relates to improvements in a substance detecting system. More specifically, the present invention teaches special techniques which minimize size and weight in a Mass Spectrometer System/Gas Chromatograph ("GCMS") system.

BACKGROUND OF THE INVENTION

It is often necessary to ascertain the composition of various substances. For example, there are many important applications for real-time, on-site measurements of compounds in various environments. These include measurements at toxic waste sites, work places, industrial sites, accidental spill sites, and semiconductor fabrication facilities. A gas chromatograph, either alone or in combination with a mass spectrometer, can be used to take such measurments.

A Gas Chromatograph ("GC") separates a sample mixture into different components according to some specified parameters. The process separates the different components spatially, causing each material to arrive at the output of the Gas Chromatograph at a different time.

These separated materials are fed to a Mass Spectrometer ("MS"). The MS allows spatially-separated materials to be individually processed by the mass spectrometer; i.e., one material can be processed at a time. The MS analyzes each single material to determine its mass spectrum. The mass spectrum of a compound consists of the intensities of different mass-ions originating from the parent molecules and their fragments. The spectrum is characteristic of the chemical compound and is used for its identification and quantitative measurement.

GCMS systems have historically been extremely large and unwieldy devices. They need high power for operation and have been extremely high in cost.

A mass spectrometer operates by ionizing a gaseous/vapor sample of material. FIG. 1 shows sample vapor being introduced into the ionization source 112 either directly, or more preferably, through a gas chromatograph 110. The gas chromatograph is preferably used for a complex mixture.

The ion source is maintained under vacuum at a pressure of ~$10^{-5}$ torr with a vacuum pump. The sample molecules are bombarded with a beam of electrons in the ionization source. The process results in the production of ions of various masses depending on the chemical nature of the sample molecules. The ions are then separated according to their masses (charge to mass ratios) by the application of electric and/or magnetic fields. Intensities of different mass ions are measured by using a detector system 116.

The gas chromatograph portion of a GC mass spectrometer has typically used a coated capillary tube. The tube is coated with polymeric materials. An inert carrying gas is passed through the capillary tube. The elements of interest—collectively called the analyte—is passed into the inert carrying gas. Each of the components of interest within the analyte have different affinities with the coating on the capillary tube. This affinity changes the flow velocities of the passage of those components down the capillary column.

Normally the operation progresses as follows. The inert gas is continuously flowing through the capillary tube. A measurement cycle is initiated by adding a "slug" of analyte. The analyte includes components with different affinities with the coating. Those different affinities change the velocity of the different components of the analyte. The different components hence arrive at the output of the gas chromatograph at different moments. Each element arriving at the output is analyzed by the mass spectrometer.

The gas chromatograph tubing has typically been a 250–500 micron diameter tubing with 2–5 atm·$cm^3$/s of gas flowing therethrough. This volume of gas through the gas chromatograph enters into the mass spectrometer and necessitates a large vacuum pump with high pumping speed to maintain the proper low pressure within the mass spectrometer. An object of the present invention is to minimize the amount of gas which flows therethrough.

The inventor recognized that amount of gas which flows through the column can be reduced by narrowing its diameter. However, the art has generally suggested that narrowing the pipe is undesirable. One reason why those having ordinary skill in the art previously have not narrowed the diameter is because of the problems associated with narrowed GC effluent peaks. When the diameter of the column of a gas chromatograph is narrowed, the peak-widths of analytes emerging from the column are also narrow. Scanning-type mass spectrometers, which typically lose a large percentage of the signal, have been unable to make multiple mass spectral measurements of these narrow peaks. It is an object of the present invention to obviate these problems using special new techniques described according to the present invention.

Mass spectrometers can be of a scanning-type or of a nonscanning-type (focal plane type). A scanning-type MS separates the different mass ions in time. Each intensity is measured successively by a single element detector. The ions of all the other masses are discarded during the time while the intensity of one mass is measured. A focal plane type MS, in contrast, spatially separates ions of the different masses. The intensities of these spatially-separated ions are measured simultaneously with a photographic plate, or an array detector, having multiple elements, of high sensitivity and spatial resolution.

A block diagram of the scanning type mass spectrometer is shown in FIG. 2. The quadruple mass spectrometer shown in the figure is a typical example of this type of MS. Ions are produced from an ion source 200 and the output ions enter a tuned cavity 202. Cavity 202 is tuned to allow only a single mass ion 204 to pass; all the other untuned ion masses 206 are discarded in order to resolve only the tuned mass ions. The tuning of the cavity is scanned over time. This means that different ion masses are successively allowed to pass at different times. At any given time, therefore, only a single ion mass will hit the detector 210 e.g., an electron multiplier. The intensity of the ions measured by the detector, therefore, indicates the amount of ions of that mass in the sample.

Scanning over the whole mass spectrum enables determination of a plot of mass versus intensity. Each particular material is formed from a unique combination of different masses and their intensities. The combination is called a mass spectrum 118. Thus, the scanning plot (mass spectrum) provides the chemical nature of the material.

Scanning-type devices de-tune most of the ions at any given time. Hence, most of the signal generated from a sample is deliberately lost prior to detection. These devices have limited scan rate and possess relatively low sensitivity.

The focal plane type of mass spectrometer spectrally analyzes all the different mass-ions from the sample at once. The mass spectrometers based on Mattauch-Herzog ("M-H") geometry or Dempster geometry are examples of this type of MS.

FIG. 3 schematically shows an array type MS of the Dempster design. A magnetic field in the magnetic analyzer 303 is used to separate the different mass ions. Each ion mass is directed to a different location 304, 306 along the focal plane. An array of detectors with high spatial resolution is placed along the focal plane to measure the intensities of all the ions simultaneously. Signals from different detector elements provide the intensities of different mass ions. The individual detector elements of the array detector for this focal plane geometry need to be small so that signal measurements with spatial resolutions of 10–30 microns can be accomplished. Multiple detector elements cover the region of each mass ions. The intensity/peak profile of each mass is thus obtained from the detector output.

Both types of mass spectrometers measure a characteristic spectrum of intensity versus mass. As described above, this spectrum can be used to identify the compound.

GCMS arrays have broad uses. However, the high cost of using a GCMS system has often prevented the GCMS from being used in certain operations. This high cost is not only based on the hardware; GCMS systems are very heavy and hence difficult to transport. Reducing the size and hence weight of the device can therefore significantly reduce the cost of transportation.

SUMMARY OF THE INVENTION

In view of the above, the present application describes techniques of modifying the GCMS system in a way that allows it to be used for more applications. The GCMS of the present invention defines special techniques which enable smaller operating components. This includes a smaller magnet, and smaller associated components used with the magnet. It also describes special shielding techniques.

The techniques of the present application also define an improved array detector. This array detector allows more sensitivity, and hence allows the use of a microbore column. The microbore GC column enables a small gas flow. Since a small gas flow is used, a tiny vacuum pump can be used.

Techniques according to the present application include special techniques for reducing the size and weight of the magnet assembly. A first technique allows reducing the thickness of the yoke at the places only where the yoke overlaps the magnet.

A second technique involves a special kind of shielding for the ion source that emits the ions from the source to a better absolute direction.

Another technique of the present invention determines some parts of the magnet area which will not usually be used, and removes those superfluous parts. The removal of this excess magnet area and its associated yoke further reduces the size and weight of the resultant devices.

Yet another technique of the present invention provides a recess of the magnet in the ion source area which is used to compensate for fringe fields.

All these techniques will be described in detail herein.

BRIEF DESCRIPTION OF THE DRAWINGS

These and other aspects of the invention will be described in detail herein with respect to accompanying drawings in which.

DESCRIPTION OF THE PREFERRED EMBODIMENTS

Figure 1:
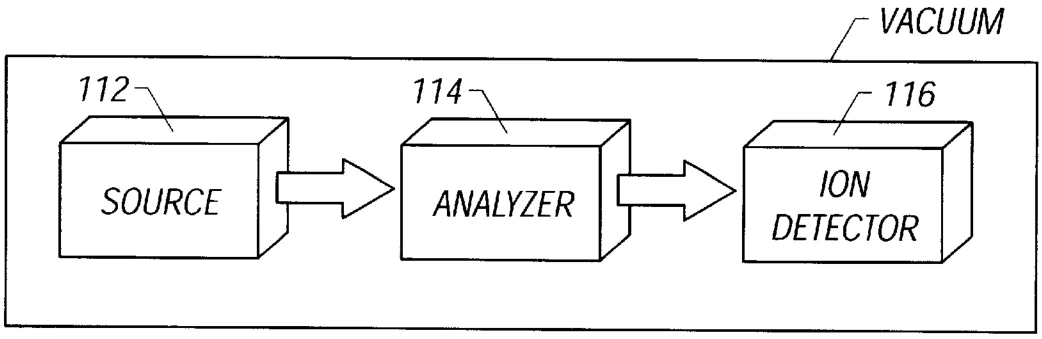
FIG. 1 shows a block diagram of an MS system.
Figure 2:
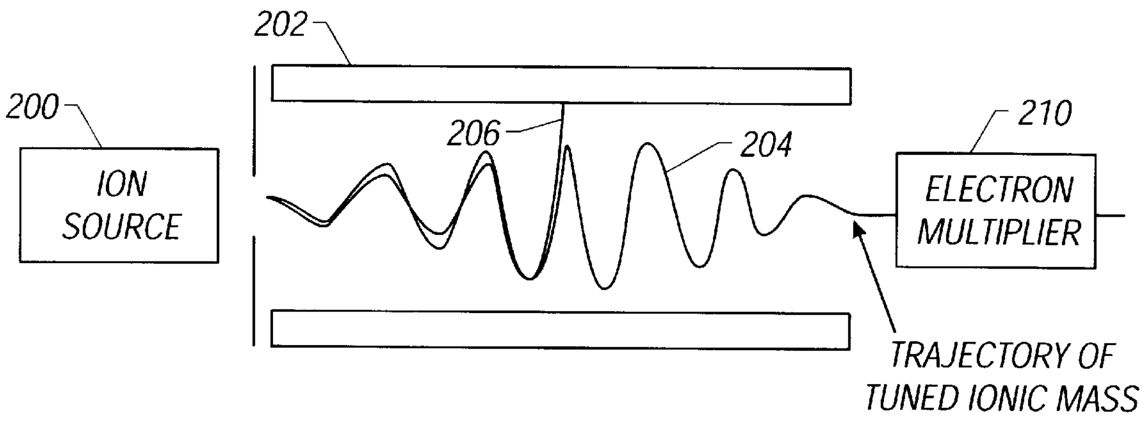
FIG. 2 shows a block diagram of a scanning MS detector.
Figure 3:
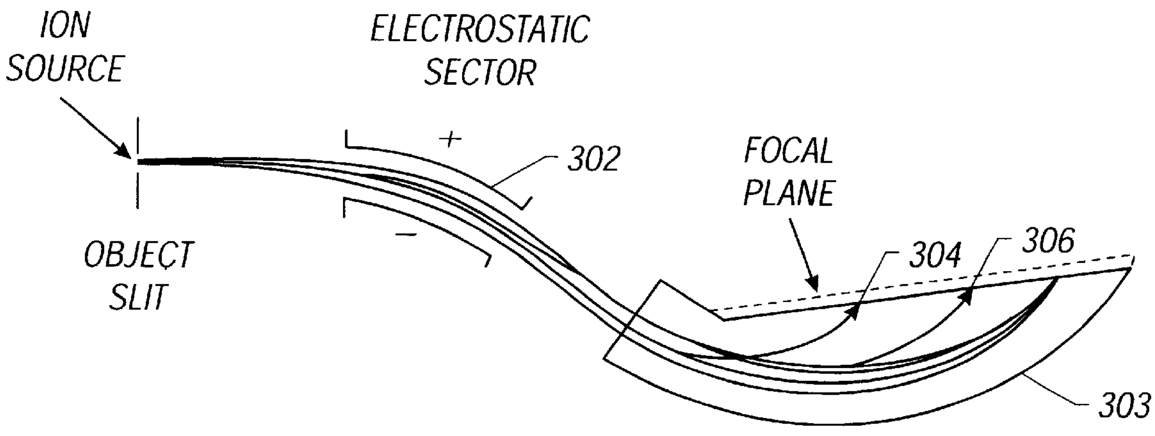
FIG. 3 shows a block diagram of an array type MS detector.
Figure 4:
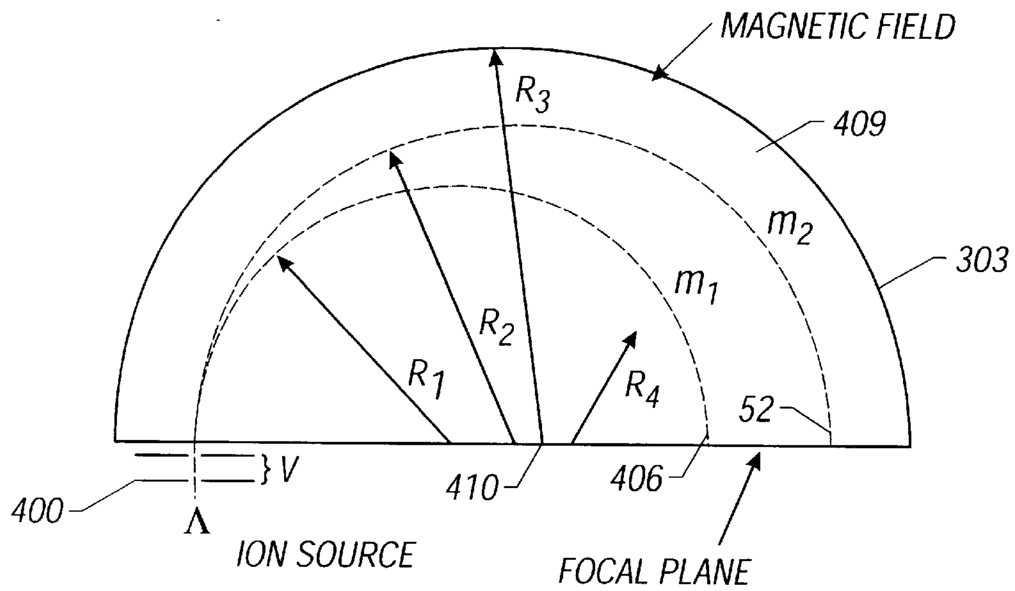
FIG. 4 shows a block diagram of the array type mass spectrograph of a first embodiment of the invention.

The focal plane MS embodiment is shown in block diagram form in FIG. 4, illustrating a first embodiment. Ion source 400 produces ions which travel in a curved path under influence of the magnetic field formed by magnet 402. Focal plane detector 404 detects the positions where the ions are finally curved back to the focal plane.

An ion of mass $m_1$ is detected at position 406. A heavier ion, of mass $m_2$, is detected at position 408. The ion's mass is therefore directly proportional to the square of the radius of curvature of the ion's trajectory within the mass spectrometer.

All mass spectrometers have inherent limits on the masses $m_1$ and $m_2$. The lower level limit of $m_1$ might be considered, for example, to be one mass unit: the mass of a hydrogen atom. The mass $m_2$ can be any number. However, values greater than around 250 atomic units are not practical using current technology because of the limitation of the dimension of the local plane.

The lower and upper limits of the mass units allow determination of the maximum and minimum radii $R_1$ and $R_2$. This leaves a portion shown as 410, where the ion will never travel. Hence, the magnetic field only needs to be present in the area 409 between the maximum and minimum radii.

The present inventor noticed, based on the mechanics of the operation, that the ions never travel in the portion 410, which hence never carries out any function. This first embodiment hence removes the portion 410, to minimize the magnet size and weight. This effectively leaves an irregular magnetic shape which lacks the area 410 removed. The magnet, therefore, is smaller and has a correspondingly smaller mass.

The specific shape of the magnet, therefore, has the outer extent defining a semicircle of the first radius shown in the drawing as $R_3$. This first radius must be larger than a second radius shown as $R_2$ which is the radius of the highest mass ion intended to be used with the device. The mass spectrograph has an inner diameter of a second radius $R_4$. This second radius $R_4$ needs to be smaller than the radius $R_1$ of the lightest possible mass which can be used. More specifically, a semicircle of radius $R_4$ is removed from a portion of the semicircle of radius of $R_3$ in order to lighten the magnet.

While the above has described specific values for the ion masses, it should be understood that the same techniques could be used to miniaturize the magnet for any desired range of ion values. By determining the desired mass of ions to be detected, the magnet can be appropriately miniaturized.

A second aspect relates to compensation of the fringe field.

The magnetic field produced by the magnet source includes a desired part and a fringe part. The ion usually travels under the influence of the desired part of the magnetic field. However, the inventor noticed that the fringe part of the magnetic field ("fringe field") can have an undesired effect on the ion's path.

Figure 5:
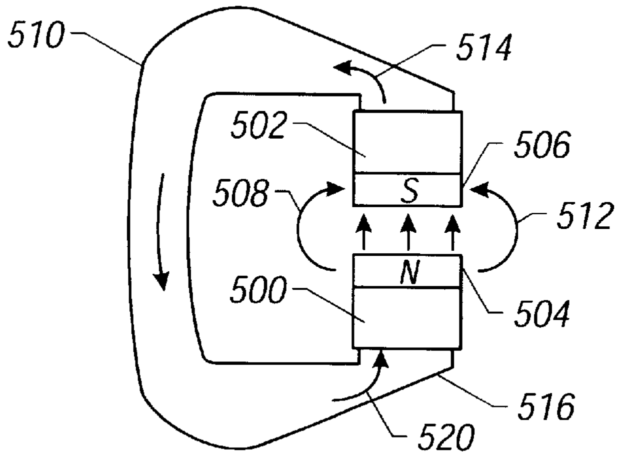
FIG. 5 shows a cross section of the preferred mass spectrograph along the line 5—5 in FIG. 4.

This phenomenon is illustrated in FIG. 5 which shows a cross section along the line 5—5 in FIG. 4. The actual magnetic element includes magnetic material 500 and 502. The magnetic material 500, 502 is covered by a respective pole piece; the pole piece 504 has a north polarity, and the pole piece 506 has a south polarity. The magnetic flux travels north to south, as shown by flux arrows 508. The magnetic flux can only travel in a complete circuit, and hence a yoke piece 510 connects the magnet 502 to the magnet 500. This yoke piece 510 also carries magnetic flux as shown by the arrows, to complete the magnetic circuit.

The desired magnetic field 508 is produced between the north and south pole pieces 504, 506 as shown by the straight arrows 508. However, stray flux also traverses a curved path between the edges of the magnets. This stray flux, called the fringe field, travels outside of the area of the desired magnetic field. This fringe field 512 hence produces a magnetic field outside the desired area of interest.

The ion source 400 is physically located outside of the magnet's area to allow the ions to be produced and coupled to the MS. The ion source is preferably very close to the magnet area to allow the ions to enter the MS.

Figure 6A:
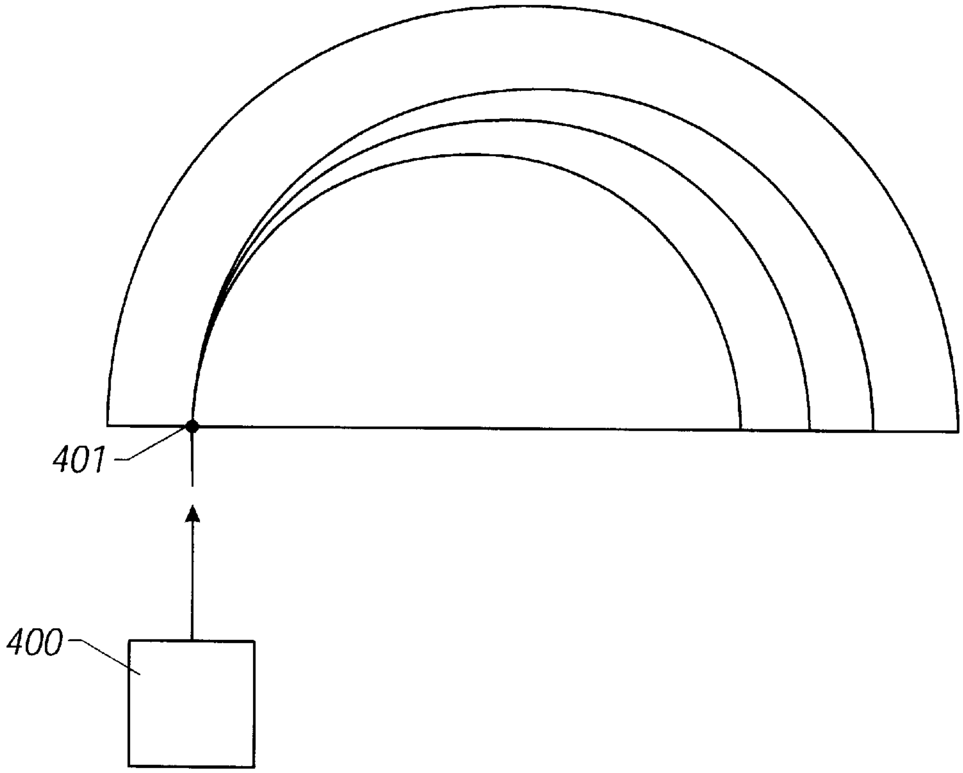
FIGS. 6A–6C show various aspects of the ion path in the mass spectrograph.
Figure 6B:
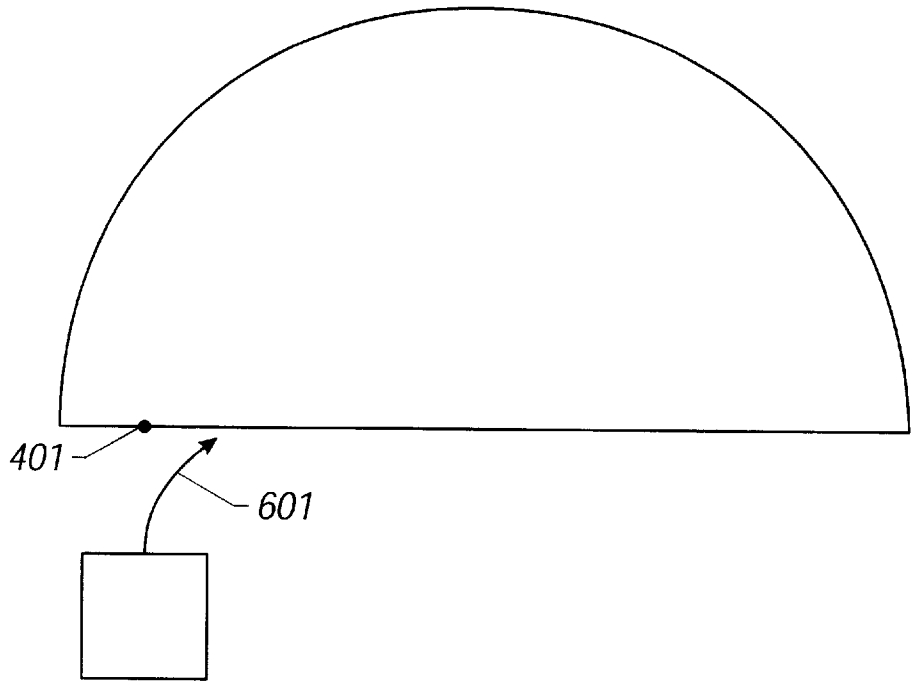

FIG. 6A shows an ideal ion trajectory from the ion source 400 to the entry point 401 within the MS. This ideal trajectory is straight, allowing the ions to enter at the ideal point 401. FIG. 6B shows the actual trajectory, however, in the presence of a fringe field. The fringe field tends to bend the ion's path, so that it arrives not at the desired point 401, but rather at some other point 601. This has been compensated by either additional magnetic compensation, or a larger ion entry point. The inventor believes that either of these is undesirable.

The additional magnetic compensation would require additional magnets which add more weight and cost to the eventual unit. The larger opening allows more of the fringe field to escape.

Figure 6C:
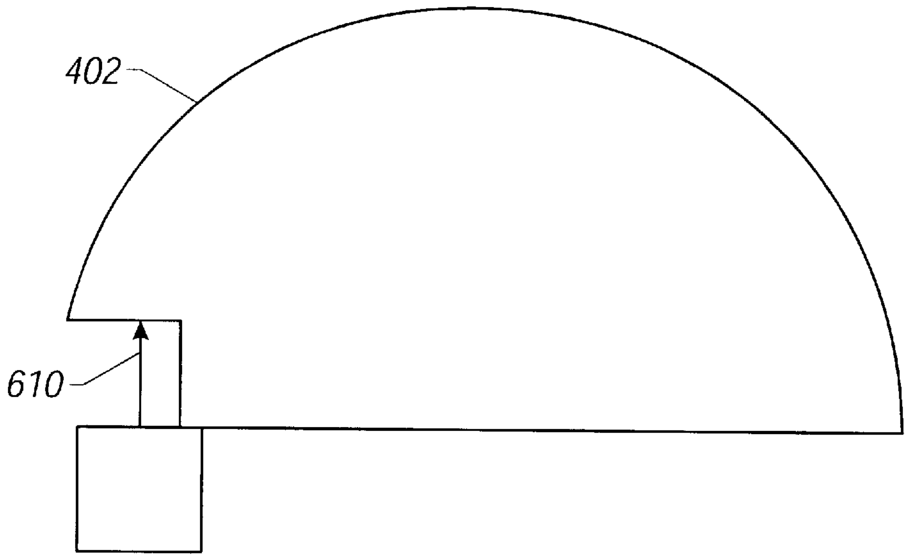

The present solution to this problem is to recess a portion of the magnet as shown in FIG. 6C. This recessed portion of the magnet is adjusted so that the portion 610 of the magnet that is removed substantially corresponds to the effect of the fringe field of the magnet outside magnet area 401. This adjustment compensates for the effect of the fringe field. This not only avoids the need for compensating magnets, but also itself further decreases the weight of the magnet since it removes a notch from the magnet.

Hence, this aspect of the invention removes a portion of the magnet to compensate for the effect of the fringe field on the ion's path.

An additional weight-reducing feature reduces the mass of the yoke material. The inventor noticed that a large portion of the magnet assembly's mass is caused by the yoke material 510. The yoke structure cannot be made thinner than a certain amount. Any thinner than that amount would allow the yoke to saturate from the magnetic flux passing through it. The yoke needs to have sufficient mass to avoid this magnetic saturation.

However, the inventor noticed that the magnetic flux begins to enter the associated magnet at locations where the yoke adjoins the magnet. Therefore, at the edges 514, 516, the magnetic flux begins to bend toward the magnet. This magnetic flux enters the magnetic material at the position 520, thus leaving less of the magnetic flux at the positions to the right of 520. Since there is less magnetic flux, there is correspondingly less need for the amount of yoke material. The inventor realized that these transition portions of the yoke could be made smaller in those areas where they meet the magnet. The yoke is hence tapered in an area at spots where there is less flux. Some of the flux has entered or left the magnet and hence there is less flux to be contained in the yoke. According to this aspect therefore, the position where the yoke overlaps the flux is tapered. This removes some of the material and hence some of the weight from that portion.

Figure 7:
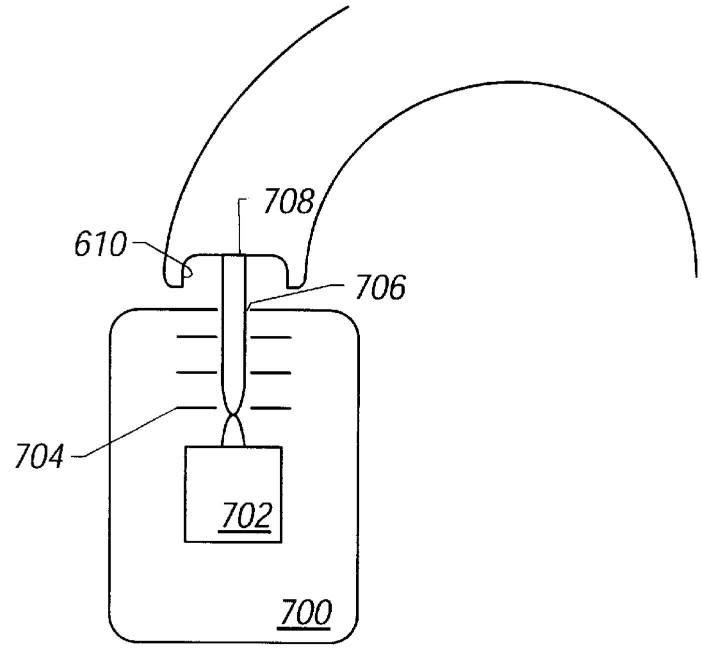
FIG. 7 shows a detailed view of the mass spectrograph with ion source of the present embodiment.

Yet another aspect recognizes the effect of the magnetic fringe field on the ion and electron trajectories. Hence, another aspect of this embodiment uses a magnetic shield around the ion source. FIG. 7 shows the magnetic shielding 700 of the ion source. The ion shield 700 is preferably formed of a "mu" metal. The ions are produced by ion source 702, and focused in a known way by plates 704. They pass through a small slit 706 in the shielding area which is preferably as small as possible (e.g. 150 mils; 0.150 inch) to allow the ions from the source to pass there through. The ions then enter the magnet area at 708 where they come under the influence of the magnetic field.

FIG. 7 hence shows the shape of the eventual magnet including the recess 610, and the removed magnet portion 410.

The slit is preferably between 2 and 5 mils and 100 mils in width.

The recess has been found to be approximately half the width of the gap. Typically values include a 150 mil gap and a 70–75 mil recess.

Figure 8:
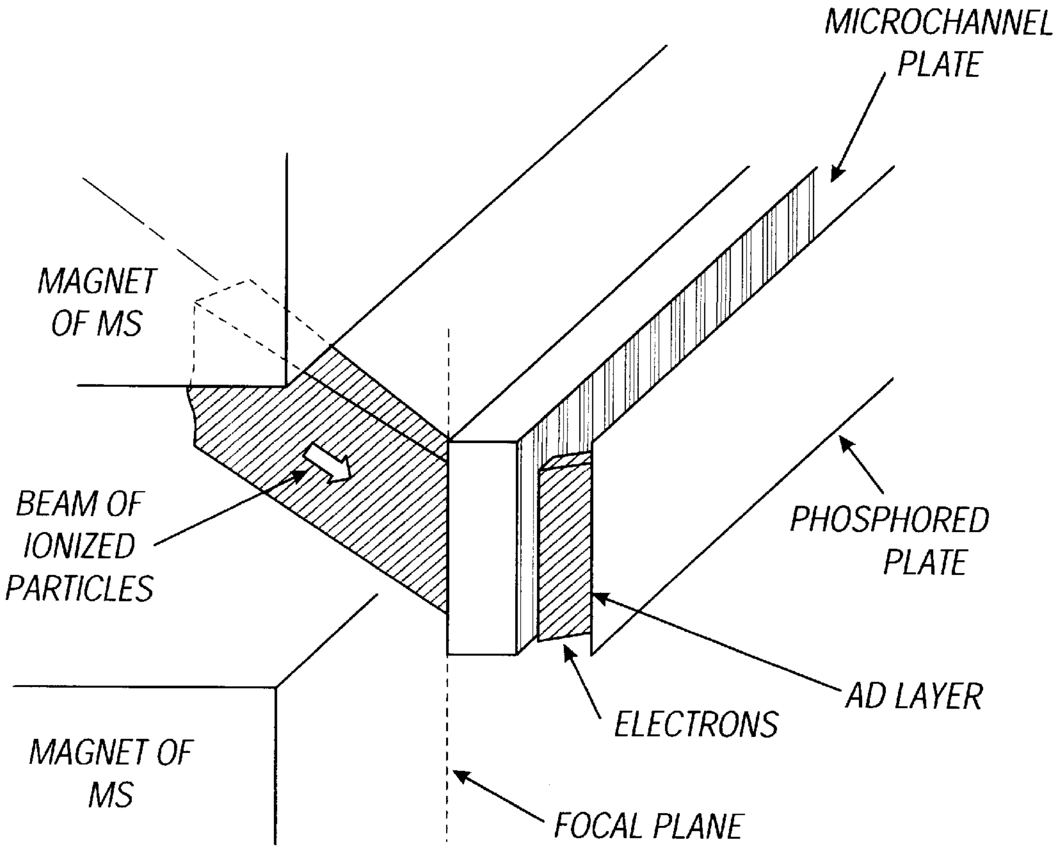
FIG. 8 shows a block diagram of the detector of this embodiment.

FIG. 8 shows the array detector device that is used for the ion measurements. A microchannel plate has been used to amplify the intensity of the arriving ion species. Each of the channels is typically separated by 6 to 25 microns center-to-center. The ions strike a channel of the plate, generating electrons. The electrons bounce back and forth, each time striking the channel walls, and each generating yet another electron. This system is repeated to produce a thousand-fold gain. This system is descriptively called a microchannel electron multiplier.

The electrons that are output from the plate impinge on an imaging system which allows viewing the images of the electrons. The imaging device has a phosphor layer deposited on a fiber optic plate. In the previous art in viewing the images of these electron thin aluminum layer has been deposited on the top of the phosphor which provides an electrically conductive layer on the phosphor. The electrons strike the phosphor after penetrating through the aluminum layer. The electrons striking the phosphor excite phosphorescence in the phosphor. The photons can be seen or measured with a CCD, photodiode array or active pixel sensor type device. These sensors measure the photon images of the different mass-ions simultaneously.

This focal Plane type system enables much more efficient use of the signal generated from the analytical sample. The system has a 100% duty cycle and orders of magnitude greater sensitivity/detectivity than the scanning type system which discards most of the ion information. However, those having ordinary skill in the art have recognized a number of limitations in this system.

Figure 9:
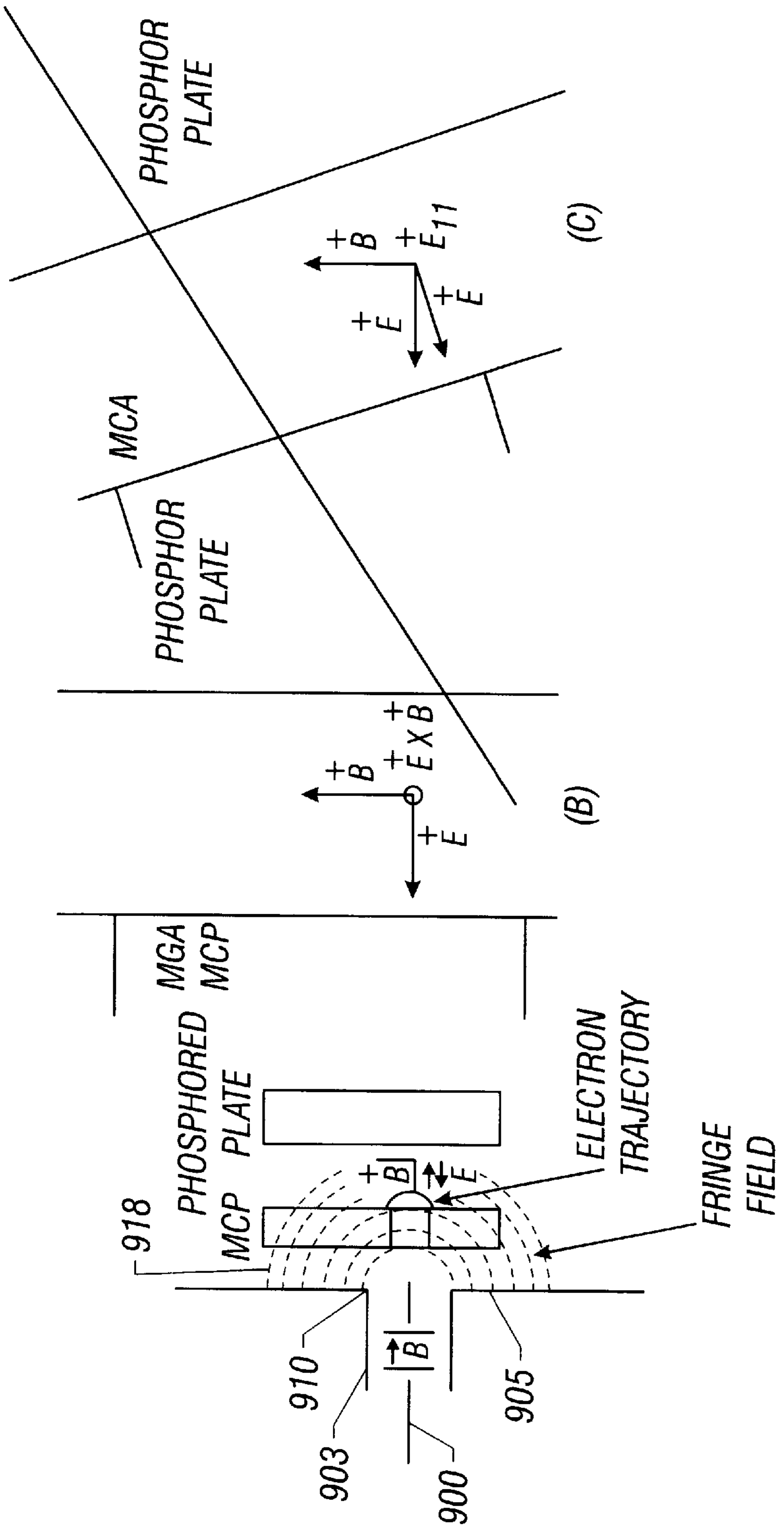
FIG. 9 shows aspects of the fringe field of this embodiment.

FIG. 9 shows the output area of the system which forms the focal plane. The exiting ions are traveling substantially in the direction of axis 900 when they exit electrons. Since the incoming electrons would be repelled, they would never reach the phosphor plate, and hence never be displayed. The prior art has responded by placing a thin conducting layer of aluminum described above the phosphor plate to avoid the charge accumulation phenomenon.

However, in order for the electrons to be displayed, they must have sufficient energy to pass through this conductive layer. Electrons had to be accelerated to a high energy so that they could penetrate through the A1 layer and excite phosphorescence. This was accomplished by applying a high voltage (4–10 kV) between the back of the MCP and the phosphor plate. The application of high voltage necessitated that the phosphor plate be separated from the MCP at the electron output by 1–2 mm in order to avoid an electrical breakdown due to high electric field in this region.

This spacing, however, has allowed enough space for the fringe field to reverse the direction of the electrons. One problem in the prior art, therefore, has been the fringe field turning the electrons in a way such that they do not hit the Phosphor.

The problems in the previous art were responded to in various ways.

Figure 10:
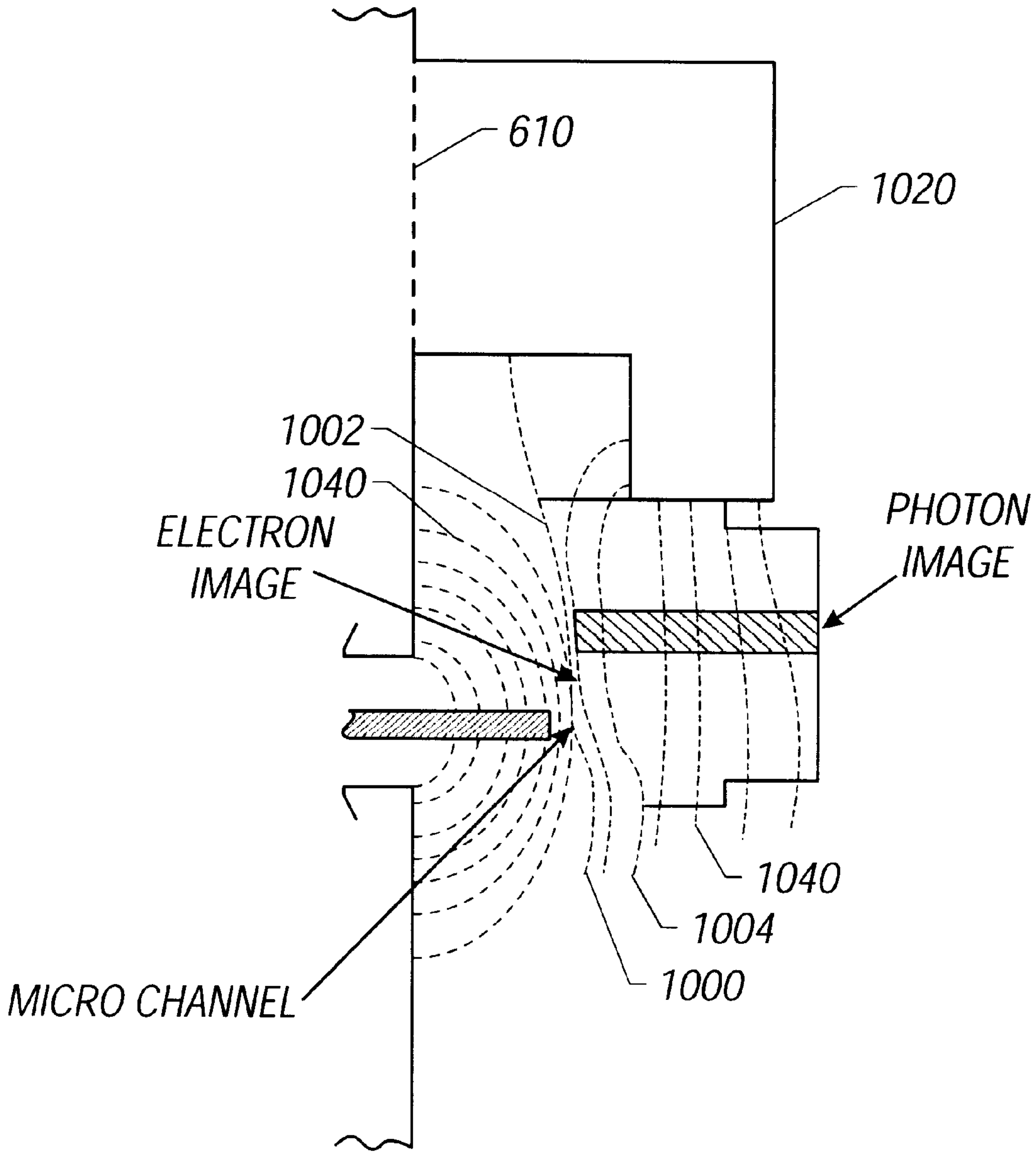
FIG. 10 shows the imager of the embodiment.

FIG. 10 shows a first solution. The electron detector 1000 has an input face 1002 along plane 1004. Plane 1004 is tilted relative to the focal plane 1010—i.e., is not parallel therewith. Another solution is also shown in FIG. 6. This uses a magnet extension and shim 620. This modification of the pole pieces of the magnetic sector effectively modify the directions of the magnetic field between the back of the MCP 1030 and the phosphor plate 1040. The modified magnetic flux for this fringe field region is shown in FIG. 10. These changes enable the electrons to strike the phosphor layer.

Other embodiments are within the disclosed embodiments.

What is claimed is:

1. A magnet apparatus for a mass spectrograph, comprising:

a magnet element, having an outer form with a first outer perimeter having a first circular arcuate shape which has a radius that is larger than a first radius of travel of the heaviest possible ion to be used by said mass spectrograph; and a second outer perimeter defining a cutout portion of the magnet within which no magnetic material is located, said cutout portion being of a substantially circular arcuate shape, and being smaller than a second radius of travel of a lightest possible ion to be detected by mass spectrograph such that no magnetic material is located in an area which is smaller than said second radius of travel.

2. An apparatus as in claim 1, further comprising an ion source entrance, through which said ions are injected and from which said ions travel with a respective radius between said first and second radius.

3. An apparatus as in claim 2, wherein said heaviest mass ion travels with a radius R2, said lightest mass ion travels with a radius R1, said outer perimeter being substantially a semicircle of a radius R3 greater than R2 and said second outer perimeter being a semicircle of radius R4 less than R1.

4. An ion bending system for a mass spectrograph, comprising:

an ion source, producing ions at its output; and a magnet, said magnet having first and second pole pieces connected by a magnetic yoke, said magnet having a desired magnetic area and a fringe magnetic area outside the desired magnetic area, and having a removed portion, in an area of said ion source, said removed portion sized to compensate for an effect of said fringe magnetic field on a path of travel on an ion.

5. An ion bending system for a mass spectrograph, comprising:

an ion source, producing ions at its output; and a magnet, having a shape with two opposing semicircular portions, one defining a first semicircle greater than a radius of travel of a heaviest possible ion, the other defining a second semicircle smaller than a radius of travel of a lightest possible ion with a removed portion within said second semicircle.

* * * * *

UNITED STATES PATENT AND TRADEMARK OFFICE
CERTIFICATE OF CORRECTION

PATENT NO. : 6,046,451
DATED : APRIL 4, 2000
INVENTOR(S) : MAHADEVA P. SINHA

It is certified that error appears in the above-identified patent and that said Letters Patent is hereby corrected as shown below:

Column 1; after the title, please insert;

-- STATEMENT AS TO FEDERALLY SPONSORED RESEARCH

Applicant herewith notifies the Patent Office that the above-referenced application may have received funding under U.S. Government Grant No. NAS 7-1407 awarded by NASA.--.

Signed and Sealed this

Twenty-seventh Day of February, 2001

Attest:

NICHOLAS P. GODICI

*Attesting Officer* *Acting Director of the United States Patent and Trademark Office*